US012608638B2

(12) United States Patent
Orús et al.

(10) Patent No.: US 12,608,638 B2
(45) Date of Patent: Apr. 21, 2026

(54) METHOD FOR GENERATING DATA INDICATIVE OF A DIGITAL TWIN

(71) Applicant: MULTIVERSE COMPUTING S.L., Donostia (ES)

(72) Inventors: Román Orús, Donostia (ES); Rodrigo Hernández, Donostia (ES)

(73) Assignee: MULTIVERSE COMPUTING S.L., Donostia (ES)

( * ) Notice: Subject to any disclaimer, the term of this patent is extended or adjusted under 35 U.S.C. 154(b) by 717 days.

(21) Appl. No.: 18/089,240

(22) Filed: Dec. 27, 2022

(65) Prior Publication Data

US 2024/0193457 A1    Jun. 13, 2024

(30) Foreign Application Priority Data

Dec. 9, 2022    (EP) ..................................... 22383199

(51) Int. Cl.
*G06N 10/60*        (2022.01)
*G06N 10/40*        (2022.01)

(52) U.S. Cl.
CPC ............. *G06N 10/60* (2022.01); *G06N 10/40* (2022.01)

(58) Field of Classification Search
CPC ...................................................... G06N 10/60
USPC .......................................................... 706/62
See application file for complete search history.

(56) References Cited

U.S. PATENT DOCUMENTS

| | | | |
|---|---|---|---|
| 2021/0173969 A1 | 6/2021 | Abbey et al. | |
| 2022/0050921 A1* | 2/2022 | LaFever ................. | G16H 10/60 |
| 2022/0147876 A1* | 5/2022 | Dalli .................... | G06N 3/0895 |
| 2022/0171907 A1 | 6/2022 | Chang et al. | |
| 2022/0317107 A1* | 10/2022 | Rooney ................. | G01N 33/24 |
| 2022/0375621 A1* | 11/2022 | Cheng .................... | G16H 10/60 |
| 2023/0054446 A1* | 2/2023 | LaFever ................ | H04W 12/75 |
| 2024/0031224 A1* | 1/2024 | Stockert ................ | H04B 10/70 |
| 2024/0135334 A1* | 4/2024 | Kairali ............... | G05B 19/4184 |
| 2024/0177034 A1* | 5/2024 | Jones ..................... | G06N 10/20 |
| 2024/0319774 A1* | 9/2024 | Salvat Lozano .......... | G06F 1/26 |

FOREIGN PATENT DOCUMENTS

| | | | | |
|---|---|---|---|---|
| EP | 4068140 A1 | 10/2022 | | |
| WO | WO-2023021722 A1 * | 2/2023 | ............... | G06N 5/01 |
| WO | WO-2023086033 A2 * | 5/2023 | ......... | G06F 11/3457 |
| WO | WO-2023097022 A1 * | 6/2023 | ........... | H04L 9/3239 |

OTHER PUBLICATIONS

European Search Report for European Application No. 22383199.1, dated Jun. 5, 2023, 15 pages.
Jaschke et al., "Ab-initio two-dimensional digital twin for quantum computer benchmarking", arxiv.org, Cornell University Library, Oct. 7, 2022, 15 pages.

* cited by examiner

*Primary Examiner* — Ruay Ho

(74) *Attorney, Agent, or Firm* — CANTOR COLBURN LLP

(57)        ABSTRACT

Data acquirable from a physical system is received and processed by at least one classical computing device to provide data indicative of a digital twin of the physical system by digitally computing a quantum-inspired algorithm. The data indicative of the digital twin is indicative of a reconfiguration of a physical parameter of the physical system, and the physical parameter has a reconfigurable digital counterpart in the digital twin.

13 Claims, 4 Drawing Sheets

METHOD FOR GENERATING DATA INDICATIVE OF A DIGITAL TWIN

CROSS-REFERENCE TO RELATED APPLICATIONS

This application is related to and claims the benefit of European Patent Application No. 22383199.1, filed on Dec. 9, 2022, the contents of which are herein incorporated by reference in their entirety.

TECHNICAL FIELD

The present disclosure is encompassed within the field of generation of data indicative of a digital twin of a physical system.

BACKGROUND

A digital twin of a physical system is an estimated virtual representation of the physical system. It is known that digital twins have many applications, such as monitoring the physical system and simulating the physical system. A particular application is the generation of real-time digital twins of physical systems. However, for some digital twins, the latency of the generation of the digital twin is too high to be considered real-time for certain applications.

In addition, some physical systems are too complex to be able to generate, by means of a method know in the art, a digital twin which accurately behaves like the physical system. This issue is frequent in physical systems comprising a huge number of components and in physical systems comprising a huge number of physical parameters which have a significant impact on the behavior of the physical system.

Therefore, it would be advantageous to generate data indicative of a digital twin of a complex physical system in a quick manner.

SUMMARY

A first aspect of the disclosure relates to a method for generating data indicative of a digital twin of a physical system, the method comprising:

receiving, by at least one classical computing device, data acquirable from the physical system; and processing, by the at least one classical computing device, the data acquirable from the physical system to provide the data indicative of the digital twin, the processing comprising digitally computing a quantum-inspired algorithm.

Thereby, the method allows taking advantage of quantum-inspired algorithms for generating data indicative of a digital twin at a relatively high speed compared to other methods relying on mere algorithms which are not quantum-inspired. Thereby, the method allows enhancing the quality of the data indicative of the digital twin and decreasing the processing time required for obtaining the data indicative of the digital twin. For example, the method allows obtaining data indicative of a digital twin in real-time, the data having higher quality (e.g. reflecting the physical behavior of the physical system in a more accurate manner) compared to the data generated by other methods merely relying on algorithms which are not quantum-inspired. In addition, this method allows enhancing the obtention of data indicative of a digital twin without requiring a quantum computing device, since the quantum-inspired algorithm may be performed merely by classical (i.e. digital) computing.

The quantum-inspired algorithm is an algorithm which classically (i.e. digitally) emulates quantum phenomena. The method may be applied to a broad range of physical systems. Examples of the physical system are: a vehicle, an industrial process, a robotic system, a biological system, an image processing system and an information system. Particular examples of the physical system are: manufacturing equipment of one or more factories, and containers storing fluid.

The data acquirable from the physical system may be used in the step of processing, by the at least one classical computing device, by at least one of:

subjecting the data acquirable from the physical system to the quantum-inspired algorithm, and adjusting the quantum-inspired algorithm (e.g. at least one of: adjusting an operation comprised by the quantum-inspired algorithm, and adjusting a value comprised by the quantum-inspired algorithm, the value being subjected to an operation comprised by the quantum-inspired algorithm).

In some embodiments, the method comprises generating the digital twin based on the data indicative of the digital twin. Thereby, the method allows, for example: generating a digital twin of the physical system in a current moment, estimating a future value of a physical parameter of the physical system or simulating the physical system based on the data acquirable from the physical system. For example, the method allows generating a digital twin in real-time, the digital twin having higher quality (e.g. responding quicker and more accurately to updates of the data acquirable from the physical system) compared to digital twins generated by other methods merely relying on computation of algorithms which are not quantum-inspired.

In some embodiments, the quantum-inspired algorithm is at least one of: a quantum-inspired algorithm of optimization and a machine learning model. The machine learning model is an algorithm which provides an output upon application of the machine learning model to data acquirable from the physical system, the output being data indicative of a digital twin of the physical system. The machine learning model comprises, for example, a neural network.

Some examples of the quantum-inspired algorithm of optimization are quantum-inspired algorithms which upon execution by the at least one classical computing device emulate quantum execution of at least one of: an algorithm of quantum annealing, a variational quantum eigensolver, a quantum approximate optimization algorithm, an algorithm of non-orthogonal variational quantum optimization and an algorithm of continuous quantum variational optimization. Another example of the quantum-inspired algorithm of optimization is an algorithm of optimization based on a tensor network.

A model of the digital twin is a model defining a physical behavior of the physical system. The model allows estimating an output of the physical system by applying the model to certain data acquirable from the physical system, the physical system being subjected to physical parameters having certain values, and the certain data being indicative of the physical parameters having the certain values.

The quantum-inspired algorithm which upon execution by the at least one classical computing device emulates an algorithm of quantum optimization may be configured to provide, when applied to data acquirable from the physical system, at least one of: data indicative of an optimized configuration of the digital twin and data indicative of an optimized model of the digital twin. The data indicative of an optimized configuration of the digital twin is data indicative of an estimation of an optimized configuration of the physical system. The data indicative of an optimized model of the digital twin is, for example, data indicative of a model which has at least one of: an optimized execution time and an optimized accuracy of representation of the physical behavior of the physical system.

In some embodiments, the step of computing a machine learning model comprises training the machine learning model. The training of the machine learning model may be based on the data acquirable from the physical system. The training of the machine learning model allows increasing training speed and enhancing quality (e.g. the accuracy) of the data indicative of a digital twin of the physical system compared to a method merely relying on computation of algorithms which are not quantum-inspired.

In some embodiments, the step of computing a machine learning model comprises inputting data acquirable from the physical system into the machine learning model so that an output of the machine learning model is obtained. The machine learning model is an algorithm which provides an output upon application of the algorithm to data acquirable from the physical system, the output being data indicative of a digital twin of the physical system.

Thereby, the computing of the machine learning model by the at least one classical computing device may allow obtaining data indicative of a digital twin of the physical system, the data indicative of the digital twin having relatively high quality and being obtained in a relatively quick manner when compared to other machine learning algorithms performed merely by classical computing.

Some examples of the quantum-inspired algorithm being a machine learning model are quantum-inspired algorithms which upon execution by the at least one classical computing device emulate quantum execution of at least one of: a quantum boost algorithm for classification in quantum annealers and universal quantum computers, a model of quantum support vector machine, a model of variational quantum classifiers, a quantum clustering algorithm and a model of quantum neural networks. Another example of the quantum-inspired algorithm being a machine learning model is an algorithm based on a tensor network, such as: a support vector machine using a tensor network, an algorithm based on a neural network of tensors (i.e., a neural tensor network), an algorithm based on a convolutional network of tensors (i.e., a convolutional tensor network) and an algorithm of tensor boost.

Algorithms (e.g., algorithms of optimization and/or algorithms being a machine leaning model) based on a tensor network allow enhancing mimicking in a quantum-inspired way, by a classical computing device, quantum processing of information and correlations; the quantum processing being performed by a quantum computing device. Moreover, algorithms based on a tensor network may be tailored directly to correlations in data structure, without requiring emulating quantum processing by a quantum computing device, thereby allowing faster and more efficient computation.

In some embodiments, the method comprises processing, by at least one computing device, first data acquirable from the physical system to reduce a dimensionality of the first data thereby obtaining second data; the at least one computing device being additional to the at least one classical computing device; the second data being the data acquirable from the physical system received in the step of receiving. Thereby, the dimensionality of the data received by the at least one classical computing device is decreased. Data having reduced dimensionality (and hence, data having lower size) can be sent quicker to the at least one classical computing device compared to data having a relatively higher dimensionality (and hence, data having higher size). In addition, since the dimensionality reduction takes place before the at least one classical computing device receives the data and is performed by the at least one computing device additional to the at least one classical computing device, the dimensionality reduction can be performed in parallel with computations performed by the at least one classical computing device, thereby increasing speed of generation of the data indicative of the digital twin.

An example of reduction of dimensionality comprises processing data acquirable from a physical system for generating a particular label depending on a physical feature derivable from the data acquirable from the physical system. For example, if the data acquirable from the physical system is an image, the dimensionality of the image can be reduced by processing the image so that a label (e.g. a first label, a second label or a third label) is generated depending on a defect shown in the image, the label having lower size than the image. Thereby, the at least one classical computing device receives the label (e.g. the first label, the second label or the third label) instead of the whole data of the image.

In some embodiments, the data received by the at least one classical computing device in the step of receiving is based on data acquired by at least one sensor. Examples of data based on data acquired by at least one sensor are: data acquired by the at least one sensor and data acquired by the at least one sensor which has been subsequently processed (e.g. encrypted). The data acquirable from the physical system may be received by the at least one classical computing device directly from the sensor, from a server in which the data is stored prior to sending the data to the at least one classical computing device or via a communications module.

In some embodiments, the reduction of dimensionality of data acquired by a first sensor of the at least one sensor is performed independently from data acquired by a second sensor of the at least one sensor, and a reduction of dimensionality of the data acquired by the second sensor is performed independently from the data acquired by the first sensor. In this way, the reduction of dimensionality of data acquired by the first sensor does not depend on data acquired by the second sensor, and hence the dimensionality can be decreased without depending on the data acquired by the second sensor (e.g. without having to wait for acquiring the data by the second sensor and without relying on quality of data acquired by the second sensor). Thereby, the reduction of dimensionality of the data acquired by the first sensor is performed independently from the reduction of dimensionality of the data acquired by the second sensor, so that reception of data having a reduced dimensionality by the at least one classical computing device can be performed in a relatively more reliable manner from several sensors. In this way, data indicative of a digital twin having higher complexity may be provided while minimizing the reduction of accuracy of the data indicative of the digital twin.

In some embodiments, the data received by the at least one classical computing device in the step of receiving has been encrypted with post-quantum cryptography (i.e. cryptography being particularly resistant to quantum computing, such as lattice-based cryptography, multivariate cryptography or hash-based cryptography) by at least one computing device; the at least one computing device being additional to the at least one classical computing device. Thereby, the data received by the at least one classical computing device is more protected against eavesdropping attacks which may occur along the transmission path of the encrypted data to the at least one classical computing device. These embodiments allow increasing security of transmission of the data and may be particularly advantageous, for example, if the data is sent to the at least one classical computing device through a public network or through a relatively unsecure network.

In some embodiments, the at least one computing device which encrypts the data with post-quantum cryptography is the at least one computing device which reduces a dimensionality of the first data acquirable from the physical system. Thereby, the required number of computing devices may be minimized since the same at least one computing device performs the dimensionality reduction and the encryption.

In some embodiments, the at least one computing device which encrypts the data with post-quantum cryptography is not the at least one computing device which reduces a dimensionality of the first data acquirable from the physical system. Hence, at least one computing device performs the encryption of data and another at least one computing device performs the reduction of dimensionality. Thereby, the encryption and the reduction of dimensionality can be performed quicker since the computing device(s) involved in the encryption are different from the computing device(s) involved in the reduction of dimensionality.

In some embodiments, the at least one classical computing device is configured to process, in the step of processing to provide the data indicative of the digital twin, the data acquirable from the physical system, the data acquirable from the physical system being encrypted with post-quantum cryptography. Thereby, it is not required to decrypt the data acquirable from the physical system before processing the data by the at least one classical computing device, enabling a quick and secure performance of the method for generating data indicative of a digital twin of a physical system.

In some embodiments, at least one of:

the at least one sensor, the at least one computing device which processes the first data acquirable from the physical system to reduce a dimensionality of the first data, and the at least one computing device which encrypts the data with post-quantum cryptography is in premises; the at least one classical computing device being in the premises. This proximity of the at least one classical computing device allows using the at least one classical computing device for generating a digital twin of a physical system in a relatively quick manner compared to embodiments in which the classical computing device is remotely located from the premises and hence requires more time to receive data from the premises.

In some embodiments, the data indicative of the digital twin comprises data indicative of an estimation of an anomaly and a non-anomaly of the physical system. Thereby, the method allows providing data which warns of a presence of an anomaly of the physical system.

In some embodiments, the data indicative of the digital twin comprises data indicative of a reconfiguration of a model of the digital twin. Thereby, the method allows enhancing the model of the digital twin based on the data received by the at least one classical computing device. For example, the enhanced model may be a model which provides more accurate estimations of the physical behavior of the physical system.

In some embodiments, the data indicative of the digital twin comprises data indicative of a reconfiguration of a physical parameter of the physical system, the physical parameter having a digital counterpart in the digital twin; the digital counterpart being reconfigurable. In this way, the method allows obtaining reconfiguration data for adjusting (e.g. enhancing) the physical system.

In some embodiments, the method comprises at least one of: reconfiguring the model of the digital twin based on the data indicative of a reconfiguration of a model of the digital twin, and reconfiguring a physical parameter of the physical system based on the data indicative of a reconfiguration of the physical parameter.

A second aspect of the disclosure relates to a method of supervising a physical system, the method of supervising comprising the method of the first aspect of the disclosure.

A third aspect of the disclosure relates to a device or system comprising means adapted to execute the steps of the method of the first aspect of the disclosure.

A fourth aspect of the disclosure relates to at least one computing device configured to execute the steps of the method of the first aspect of the disclosure.

A fifth aspect of the disclosure relates to a computer program product that has instructions which, when the program is executed by at least one computing device, cause the at least one computing device to carry out the steps of the method of the first aspect of the disclosure.

The different aspects and embodiments of the disclosure defined in the foregoing may be combined with one another, as long as they are compatible with each other.

Similar advantages as those described for the first aspect of the disclosure are also applicable to the second, third, fourth and/or fifth aspects of the disclosure.

Additional advantages and features of the disclosure will become apparent from the detailed description that follows and will be particularly pointed out in the appended claims.

BRIEF DESCRIPTION OF THE DRAWINGS

To complete the description and in order to provide for a better understanding of the disclosure, a set of drawings is provided. Said drawings form an integral part of the description and illustrate an embodiment of the disclosure, which should not be interpreted as restricting the scope of the disclosure, but just as an example of how the disclosure can be carried out. The drawings comprise the following figures.

DETAILED DESCRIPTION OF THE DRAWINGS

The following description is not to be taken in a limiting sense but is given solely for the purpose of describing the broad principles of the disclosure. Embodiments of the disclosure will be described by way of example, with reference to the above-mentioned drawings.

Figure 1:
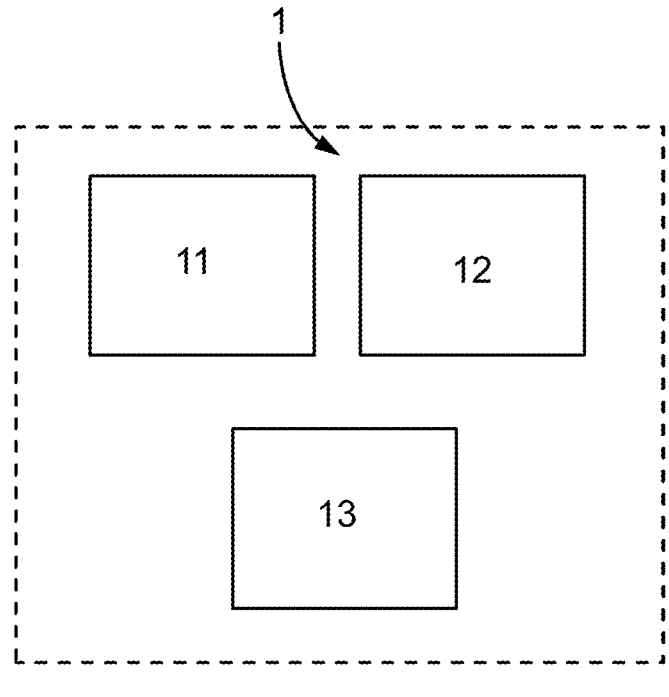
FIG. 1 diagrammatically shows a system in accordance with embodiments.

FIG. 1 shows a system 1 for generating data indicative of a digital twin of a physical system. Methods according to the present disclosure can be carried out by the system 1.

The system 1 provides data indicative of a digital twin based on data acquirable from the physical system and classical computing. The digital twin is related to a physical system which may be monitored.

The system 1 comprises at least one classical computing device 11. The at least one classical computing device 11 may be, for example, a CPU, a GPU, an FPGA, an ASIC, a personal computer, a laptop, etc. The system 1 comprises a module 12. The at least one classical computing device 11 receives data acquirable from the physical system via the module 12. The module 12 comprises at least one of: a communications module and at least one sensor.

The system 1 may also comprise a memory 13. The memory 13 may comprise at least one of: data acquirable from the physical system and data based on a result of processing, by the at least one classical computing device 11, data acquirable from the physical system.

Figure 2:
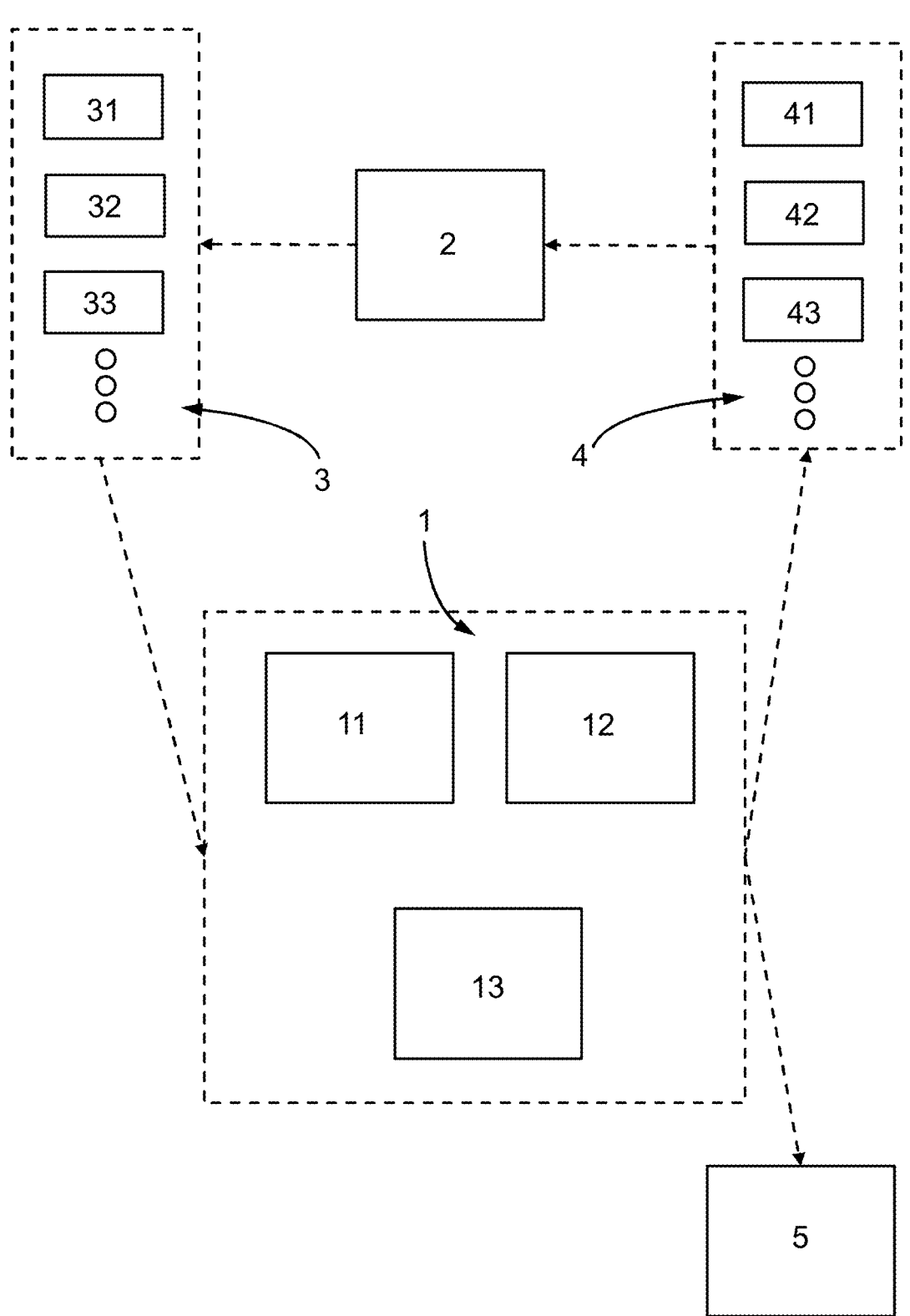
FIG. 2 diagrammatically shows a system in accordance with embodiments.
Figure 3:
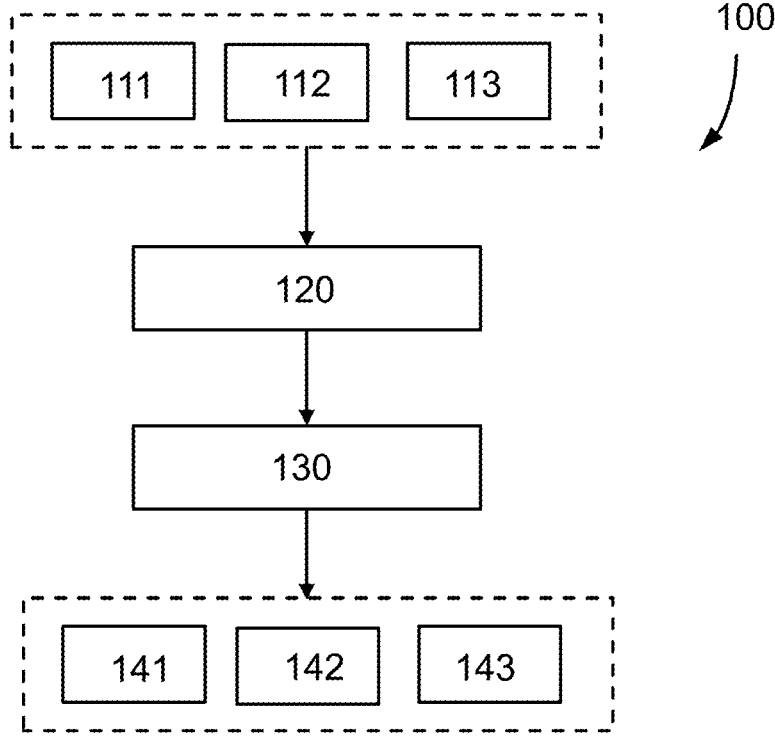
FIG. 3 diagrammatically shows a method in accordance with embodiments.

FIG. 2 shows the system 1 in combination with a physical system 2, an input system 3, an output system 4 and a user interface 5. FIG. 3 shows a method 100 for generating data indicative of a digital twin.

The input system 3 acquires data from the physical system 2 and/or stores data acquirable from the physical system 2. The input system 3 comprises at least one device, for example, at least one of: a sensor 31, a server 32, a camera 33, a PLC, and an IoT device. The input system 3 is connected to the system 1 via a communications module (not shown in FIG. 2) common to several devices of the input system 3 or via several communications modules, each communications module of the several communications modules being specific for each device of the input system 3. The input system 3 may exchange data with the system 1 via the communications module(s) of the input system 3 and the communications module of the system 1. Thereby, system 1 may receive data indicative of the physical system 2 via the devices of input system 3.

The sensor 31 may be any sensor which responds to a physical stimulus from the physical system 2, the physical stimulus being, for example, heat, light, sound, pressure, electrical energy (e.g. voltage), magnetism or motion. The sensor 31 is, for example, a temperature sensor, a pressure sensor, a light sensor, a pH sensor, an accelerometer, etc. The camera 33 is configured to capture images from the physical system 2. The server 32 may store data acquirable from physical system 2. The PLC may comprise a sensor configured to acquire data from the physical system 2. The IoT device may comprise a sensor configured to acquire data from the physical system 2. The data acquired by the sensor 31, the images captured by the camera 33, the data stored in the server 32, the data acquired by the sensor of the PLC device and the data acquired by the sensor of the IoT device may be communicated to at least one computing device of the input system 3. The at least one computing device of the input system 3 (not shown in FIG. 2) may receive data acquired by several devices of the input system 3 and/or each device of the input system 3 may have its own computing device. For example, images captured by the camera 33 may be communicated to a computing device of the camera 33. Data acquired by the sensor of the PLC may be communicated to a computing device of the PLC. Data acquired by the sensor of the IoT device may be communicated to a computing device of the IoT device. Data stored in the server 32 may be communicated to a computing device of the server 32.

The processing performed by the at least one computing device of the input system 3 may be dependent on the processing capacity (e.g. at least one of clock cycle and number of instructions performed per clock cycle) of the respective computing device. For example, the at least one computing device of the input system 3 may be configured to encrypt 111 data by applying post-quantum cryptography to the data, in particular to data acquired from the physical system 2 via at least one of: the sensor 31, the server 32, the camera 33, the PLC and the IoT node. The encryption may be performed before the data is transmitted from the input system 3 to the system 1, so that security of the transmitted data is enhanced against eavesdropping attacks which may target the data sent from the input system 3 to the system 1.

The at least one computing device of the input system 3 may be configured to decrease a dimensionality of the data received, by the at least one computing device of the input system 3, from one or more devices of the input system 3 by processing the data, the processing may comprise at least one of:

applying signal smoothing 112 to a raw signal received from an input device of the input system 3, and labelling 113 (e.g. labelling as at least one of: anomalous data, missing data values and faulty data) the data received from the one or more devices of the input system 3 (e.g. labelling by means of applying a tensorized convolutional neural network to images captured by the camera 33);

The devices of the input system 3 may be configured to apply a federated learning algorithm.

The system 1 may be located in the premises in which the input system 3 is located. The at least one classical computing device 11 may process the data received by the system 1 performing some of the steps of the method shown in FIG. 3.

The at least one classical computing device 11 receives 120 the data from the input system 3. The at least one classical computing device 11 uses the received data in the processing 130 by applying a quantum-inspired algorithm, thereby providing data indicative of the digital twin of the physical system 2. Thereby, at least one of the following is performed:

providing 141 data used in the generation of the digital twin (e.g. data indicative of a value of a parameter of the digital twin, the parameter of the digital twin having a counterpart being a physical parameter of the physical system 2);

providing 142 data indicative of a reconfiguration of the model of the digital twin; and providing 143 data indicative of a reconfiguration of a physical parameter of the physical system 2, the physical parameter having a digital counterpart in the digital twin; the digital counterpart being reconfigurable within the digital twin.

For example, the data used in the generation of the digital twin is obtained by using the received data in the performance, by the at least one classical computing device 11, of a machine learning algorithm being quantum-inspired; an output of the performance being an estimation of a prediction of a parameter of the digital twin, the parameter of the digital twin having a counterpart being a physical parameter of the physical system 2. More particularly, the output of the performance may be an estimation of a prediction of a value of a physical parameter of the physical system 2. An example of a physical parameter is at least one of: length, mass, voltage, temperature, luminous intensity, an amount of substance, time and a combination of two or more of length, mass, voltage, temperature, luminous intensity, an amount of substance and time.

In examples, the physical system 2 comprises at least one windmill, and the method 100 comprises generating a digital twin of the at least one windmill based on the data indicative of the digital twin. The data indicative of the digital twin may comprise an estimation of energy to be generated in the future by the at least one windmill. The data indicative of the digital twin is provided, by the at least one processing, by the at least one classical computing device 11, data indicative of physical parameters of the at least one windmill and data indicative of climate conditions of a region where the at least one windmill is installed or near the region, for example, data indicative of wind speed. The data indicative of climate conditions may be acquired by at least one sensor located in the region or near the region.

The processing by the at least one classical computing device 11 may comprise performing a machine learning algorithm being quantum-inspired, wherein the machine learning algorithm being quantum-inspired is at least one of:

based on the data indicative of physical parameters of the at least one windmill and on the data of climate conditions, and
    performed on the data indicative of physical parameters of the at least one windmill and on the data indicative of climate conditions.

In examples, the data used in the generation of the digital twin is obtained by using the received data in the performance, by the at least one classical computing device 11, of a machine learning algorithm being quantum-inspired; an output of the performance being data indicative of an anomaly and a non-anomaly of the physical system 2.

In examples, the data indicative of a reconfiguration of the model of the digital twin is obtained by using the received data in the performance, by the at least one classical computing device 11, of a quantum-inspired algorithm of optimization; an output of the performance being data indicative of a reconfiguration of the model of the digital twin. The output comprises, for example, data for reconfiguring the model of the digital twin.

Figure 4:
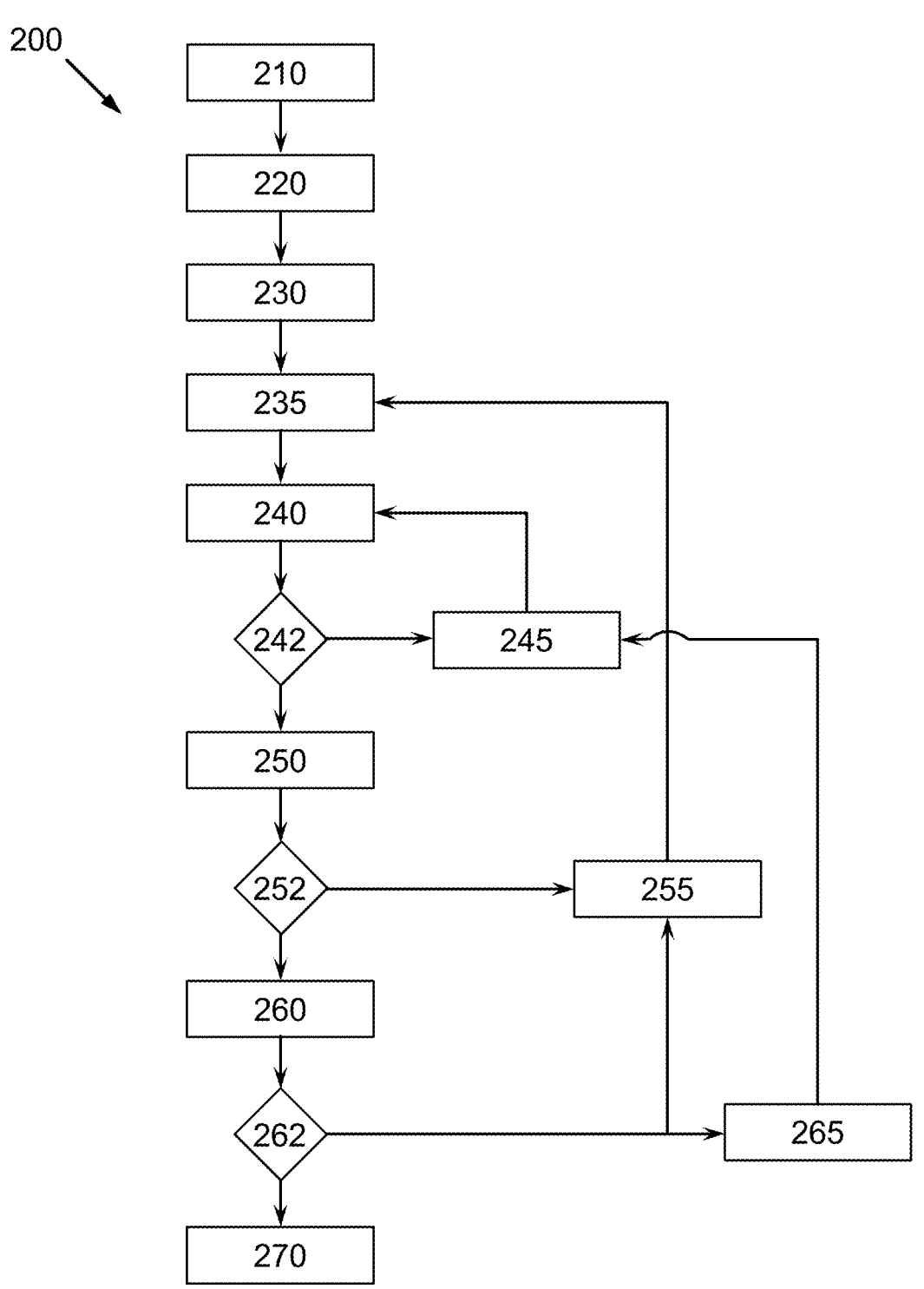
FIG. 4 diagrammatically shows a method illustrating a quantum-inspired algorithm of optimization.

Next, an example of a quantum-inspired algorithm of optimization is explained in reference to FIG. 4, the example uses a Tensor Network—i.e. TN—for solving an Unconstrained Optimization—i.e. UO—problem. This example is non-limiting in the sense that the at least one classical computing device 11 may implement other quantum-inspired algorithms.

The example of the quantum-inspired algorithm of optimization is illustrated in method 200. The method 200 comprises a step whereby the at least one classical computing device 11 provides 210 an equation with a cost function, thereby defining a cost equation function. The cost function relates to an optimization problem that is to be minimized. The cost equation function includes a multiplicity of discrete variables, i.e. variables that can only take a limited number of values. When the cost function includes continuous variables, they are digitized so as to make them discrete.

The cost function can be provided 210 by a user through user input means, e.g. a keyboard, a mouse, a touchscreen, a microphone, etc., that are connected to the at least one classical computing device 11, or are connected to a different electronic device that is communicatively coupled with the at least one classical computing device 11—e.g. via a wired or wireless connection-. Likewise, the cost function can be stored on a server or in the memory 13 of the system 1 and retrieved therefrom, or can be provided by an apparatus, system or controlling device thereof. In this sense, the optimization problem relates to the physical system 2 since the cost function characterizes, for example, a physical behavior of the physical system 2.

By way of example, when the cost function relates to a QUBO, the equation might be of the form:

$$H = \sum_{(i,j)} Q_{ij} x_i x_j + \sum_i q_i x_i$$

where $x_i$ and $x_j$ are binary variables, and $Q_{ij}$ and $q_i$ are couplings of the respective binary variables $x_i$ and $x_j$. By way of another example, when the cost function relates to a Higher-order UBO, the equation might be of the form:

$$H = \sum_{n, \langle i1, i2, \ldots, in \rangle} Q_{i1\,i2\ldots in} x_{i1} x_{i2} \ldots x_{in}$$

where $x_{i1}$, $x_{i2}$, . . . $x_{in}$, are the binary variables, and $Q_{i1, i2 \ldots in}$ are couplings of the respective binary variables $x_{i1}$, $x_{i2}$, . . . $x_{in}$.

The method 200 comprises a step whereby the at least one classical computing device 11 converts 220 the cost function equation of the providing step 210, with the plurality of discrete variables, into an UO problem.

The method 200 comprises a step whereby the at least one classical computing device 11 provides 230 a TN with tensors. The TN is configured in such a way that it covers all possible configurations of variables of the UO problem provided in the converting step 220.

The method 200 comprises a step whereby the at least one classical computing device 11 provides 235 a set of parameters with at least one parameter being for modifying the TN (e.g. a bond dimension of the TN, a unit cell of the TN, etc.), and/or with at least one parameter for influencing the subsequent step of modifying 240 coefficients (e.g. a Trotter-step in imaginary-time evolution, an error tolerance in algebra functions used for modifying the coefficients, a number of times that each tensor must have its coefficients modified, etc.).

The method 200 comprises a step whereby the at least one classical computing device 11 modifies 240, one or more times, coefficients of each tensor of the TN provided 230 for the set of parameters provided 235. The coefficients of the tensors are modified 240 such that the cost function of the UO problem decreases each time in order to achieve optimization.

The method 200 comprises a step whereby the at least one classical computing device 11 repeats 245 the modifying step 240 until first one or more predetermined criteria are met, thereby producing a loop. To this end, the at least one classical computing device 11 compares 242 the value of the cost function (or a parameter thereof) and/or a number of times that the coefficients' modifications 240 has been conducted with predetermined threshold(s) or range(s) so as to determine whether the modification 240 of coefficients of the tensors has resulted in a sufficient optimization. Regarding the former, the convergence can be established, for example, by computing a difference between the current value (or a parameter thereof) of the cost function and the value (or a parameter thereof) of the cost function before the most recent modification of coefficients of a tensor and comparing said difference with a predetermined threshold, or by computing a difference between the value (or the parameter thereof) of the cost function and the value (or the parameter thereof) of the cost function before having effected the N (with N equal to e.g. 50, 100, 500, etc.; with N equal to 1 the former example is provided) most recent modification of coefficients of tensors and comparing said difference with a predetermined threshold; when the difference does not exceed the predetermined threshold it is deemed that the value (or the parameter thereof) has converged sufficiently.

When the first one or more predetermined criteria are met, the repetition 245 of the modification 240 of coefficients is halted for the provided 235 set of parameters, and the value of the cost function is stored 250.

The at least one classical computing device 11 then checks 252 whether at least two loops of providing 235 a set of parameters and modifying 240 the coefficients of the tensors have taken place, if not, it proceeds to another step of the method 200 whereby the at least one classical computing device 11 repeats 255 said two steps 235, 240, but with a different set of parameters for further optimization. When the coefficients of the tensors have been modified 240 as explained above but for the newly provided 235 set of parameters and the first one or more predetermined criteria have been met in the corresponding comparison 242, the new value of the cost function is stored 250.

The method 200 comprises a step whereby, having at least two stored 250 values, the at least one classical computing device 11 checks 260 whether the value that has been last stored (i.e. that of the last loop run) meets a second predetermined criterion relating to a convergence reached in the value of the cost function. For that, the last stored 250 value is compared with the immediately previously stored 250 value or another previously stored 250 value to determine the convergence reached in the solution after having conducted two or more loops as described above. The convergence can be established by computing a difference between a given pair of stored values including the last one stored, and comparing said difference with a threshold to determine if the reduction that has been attained in the last loop or loops is small.

When the second predetermined criterion has not been met 262 in the checking step 260, the method 200 proceeds to the repeating 255 step (in which case a new set of parameters is provided 235) and/or to a step whereby the at least one classical computing device 11 changes 265 the first one or more predetermined criteria, and then proceeds to the repeating 245 for the same set of parameters provided 235 in the last loop that took place.

When the second predetermined criterion has been met 262, the method 200 proceeds to a step thereof whereby the at least one classical computing device 11 solves 270 the UO problem using the TN and provides respective values of the plurality of discrete variables of the cost equation.

At this point, the values that achieve a reduction in the value of the cost function of the UO problem are known. The model of the digital twin may be based on the values that achieve a reduction in the value of the cost function of the UO problem.

In examples, the data indicative of a reconfiguration of a physical parameter of the physical system 2 is obtained by using the received data in the performance, by the at least one classical computing device 11, of a quantum-inspired algorithm of optimization; an output of the performance being data indicative of a reconfiguration of a physical parameter of the physical system 2. The physical parameter may be reconfigured by an actuator of the physical system 2 via sending a signal to the actuator, the signal being based on the data indicative of a reconfiguration of a physical parameter. For example, a PLC may be reconfigured based on the data indicative of a reconfiguration of a physical parameter to improve quality of production of a manufacturing process as well as minimizing scrap generated in the manufacturing process.

FIG. 2 shows an output system 4 comprising output devices. The output system 4 interacts with the physical system 2 based on data received from the system 1. The output system 4 comprises at least one device, for example, at least one of: a control device 41, a server 42, an actuator 43, a PLC and an IoT device. The output system 4 is connected to the system 1 via a communications module (not shown in FIG. 2) common to several devices of the output system 4 or via several communications modules, each communications module of the several communications modules being specific for each device of the output system 4. The output system 4 may exchange data with the system 1 via the communications module(s) of the output system 4 and the communications module of the system 1. Thereby, the system 1 may cause an interaction with the physical system 2 via the devices of output system 4.

The control device 41 may be any control device which controls a physical parameter of the physical system 2, the physical parameter being, for example, heat, light, sound, pressure, magnetism or motion. The control device 41 is, for example, a temperature controller, a pressure controller, a light controller, a pH controller, an acceleration controller, etc. The PLC may control an actuator configured to operate within the physical system 2. The server 42 may store data received from the system 1. The IoT device may comprise an actuator configured to operate within the physical system 2.

The data received by the output system 4 from the system 1 may be encrypted with post-quantum cryptography. Each device of the output system 4 may comprise a computing device configured to decrypt the data received from the system 1, so that the output devices of the output system 4 process and/or store the decrypted data.

As shown in FIG. 2 a user interface 5 comprising a display may receive data from the system 1. The data received by the user interface 5 may be data indicative of a digital twin of the physical system 2. The user interface 5 may generate a visual representation of a digital twin on the display based on the data indicative of the digital twin received by the user interface 5.

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the disclosure is obviously not limited to the specific embodiment(s) described herein, but also encompasses any variations that may be considered by any person skilled in the art (for example, as regards the choice of materials, dimensions, components, configuration, etc.), within the general scope of the disclosure as defined in the claims.

The invention claimed is:

1. A method for generating data indicative of a digital twin of a physical system, the method including the following steps:

receiving, by at least one classical computing device, data acquirable from the physical system, and processing, by the at least one classical computing device, the data acquirable from the physical system to provide the data indicative of the digital twin, the processing comprising digitally computing a quantum-inspired algorithm;

wherein the data indicative of the digital twin comprises data indicative of a reconfiguration of a physical parameter of the physical system, the physical parameter having a digital counterpart in the digital twin; the digital counterpart being reconfigurable.

2. The method of claim 1, the quantum-inspired algorithm being at least one of: a quantum-inspired algorithm of optimization and a machine learning model.

3. The method of claim 1, comprising processing, by at least one computing device, first data acquirable from the physical system to reduce a dimensionality of the first data thereby obtaining second data; the at least one computing device being additional to the at least one classical computing device; the second data being the data acquirable from the physical system received in the step of receiving.

4. The method of claim 1, wherein the data received by the at least one classical computing device in the step of receiving has been encrypted with post-quantum cryptography by at least one computing device; the at least one computing device being additional to the at least one classical computing device.

5. The method of claim 1, wherein the data received by the at least one classical computing device in the step of receiving is based on data acquired by at least one sensor.

6. The method of claim 3, wherein at least one of:

the at least one sensor, the at least one computing device which processes the first data acquirable from the physical system to reduce a dimensionality of the first data, and the at least one computing device which encrypts the data with post-quantum cryptography is in premises; the at least one classical computing device being in the premises.

7. The method of claim 1, the data indicative of the digital twin comprising data indicative of an estimation of an anomaly and a non-anomaly of the physical system.

8. The method of claim 1, the data indicative of the digital twin comprising data indicative of a reconfiguration of a model of the digital twin.

9. The method of claim 8, comprising at least one of: reconfiguring the model of the digital twin based on the data indicative of the reconfiguration of the model of the digital twin, and reconfiguring the physical parameter based on the data indicative of the reconfiguration of the physical parameter.

10. A method of supervising a physical system, the method comprising the method of claim 1.

11. A device or system comprising means adapted to execute the steps of the method of claim 1.

12. At least one computing device configured to execute the steps of the method of claim 1.

13. A computer program product that has instructions which, when the program is executed by at least one computing device, cause the at least one computing device to carry out the steps of the method of claim 1.

* * * * *